(12) United States Patent
Yang

(10) Patent No.: US 7,940,035 B2
(45) Date of Patent: May 10, 2011

(54) CONTROL CIRCUIT HAVING AN IMPEDANCE MODULATION CONTROLLING POWER CONVERTER FOR SAVING POWER

(75) Inventor: Ta-yung Yang, Milpitas, CA (US)

(73) Assignee: System General Corp., New Taipei (TW)

( * ) Notice: Subject to any disclaimer, the term of this patent is extended or adjusted under 35 U.S.C. 154(b) by 329 days.

(21) Appl. No.: 11/624,898

(22) Filed: Jan. 19, 2007

(65) Prior Publication Data
US 2008/0175026 A1    Jul. 24, 2008

(51) Int. Cl.
*G05F 1/575*    (2006.01)
(52) U.S. Cl. .................... 323/297; 363/21.13; 323/288
(58) Field of Classification Search ............... 363/21.15, 363/21.07, 21.01, 21.12–21.14, 21.16–21.18; 323/288, 902, 297
See application file for complete search history.

(56) References Cited

U.S. PATENT DOCUMENTS

| | | | |
|---|---|---|---|
| 4,541,041 A | 9/1985 | Park et al. | |
| 5,028,861 A | 7/1991 | Pace et al. | |
| 5,285,369 A * | 2/1994 | Balakrishnan | 363/49 |
| 5,481,178 A | 1/1996 | Wilcox et al. | |
| 5,747,977 A | 5/1998 | Hwang | |
| 5,956,240 A * | 9/1999 | Williams | 363/21.16 |
| 6,188,587 B1 * | 2/2001 | Yun et al. | 363/21.18 |
| 6,370,042 B2 * | 4/2002 | Gattavari et al. | 363/21.01 |
| 6,429,709 B1 * | 8/2002 | Hall et al. | 327/175 |
| 6,462,437 B1 * | 10/2002 | Marmaropoulos et al. | 307/125 |
| 6,519,165 B2 * | 2/2003 | Koike | 363/21.12 |
| 6,597,221 B2 * | 7/2003 | Hall et al. | 327/175 |
| 7,106,042 B1 * | 9/2006 | Jackson | 323/316 |
| 2005/0281062 A1 * | 12/2005 | Choi et al. | 363/21.08 |

* cited by examiner

Primary Examiner — Harry Behm
(74) Attorney, Agent, or Firm — J.C. Patents

(57) ABSTRACT

A standby circuit is provides to on/off a power converter for power saving. The standby circuit includes a comparison circuit. The comparison circuit is coupled to a feedback loop of the power converter to generate a mode signal when a feedback signal of the feedback loop is lower than a threshold signal. A resistive device is coupled to the feedback loop. The resistance of the resistive device is increased in response to the mode signal. The mode signal is further coupled to turn off a switching control circuit of the power converter.

11 Claims, 2 Drawing Sheets

CONTROL CIRCUIT HAVING AN IMPEDANCE MODULATION CONTROLLING POWER CONVERTER FOR SAVING POWER

BACKGROUND OF THE INVENTION

1. Field of the Invention

The present invention relates to power converters, and more specifically relates to the control of switching power converters.

2. Description of Related Art

Switching power converters have been widely used to provide regulated voltage and current. However, the switching of power converter causes power losses such as conduction loss and switching loss. The switching loss is the significant loss at light load. In order to maintain high efficiency of power converter, many techniques have been developed to reduce the power consumption, such as "Full load to no-load control for a voltage fed resonant inverter" by Park, et al, U.S. Pat. No. 4,541,041; "Strobed DC-DC converter with current regulation" by Pace, et al, U.S. Pat. No. 5,028,861; "Control circuit and method for maintaining high efficiency over broad current ranges in a switching regulator circuit" by Wilcox, et al, U.S. Pat. No. 5,481,178; "Switching regulator having low power mode responsive to load power consumption" by Jeffrey Hwang, U.S. Pat. No. 5,747,977. However, the drawback of these prior arts is the detection circuit of the load. A hysteresis comparator is utilized to detect the load condition and on/off states of the power converter. The switching frequency of the power converter cannot be programmed especially when acoustic noise is generated. Besides, the output ripple caused by the burst switching is uncontrollable. These shortcomings are the main object of the present invention to overcome.

SUMMARY OF THE INVENTION

The present invention provides a control circuit including a standby circuit and a switching control circuit. The standby circuit is used to detect the load condition and on/off states of the power converter for saving power. The standby circuit includes a feedback input circuit and a comparison circuit. The feedback input circuit is coupled to the output of the power converter through the feedback loop of the power converter. The comparison circuit is coupled to the feedback input circuit to generate a mode signal when a feedback signal in the feedback input circuit is lower than a threshold signal. A resistive device and an external capacitor are coupled to the feedback signal. The resistance of the resistive device is increased in response to the enablement of the mode signal. Therefore, the impedance of the feedback input circuit is changed in response to the change of the mode signal. The mode signal is further coupled to turn off the switching control circuit of the power converter for saving power. The capacitance of the external capacitor associated with the resistance of the resistive device determines the off period of the switching control circuit of the power converter.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DESCRIPTION OF THE PREFERRED EMBODIMENTS

Figure 1:
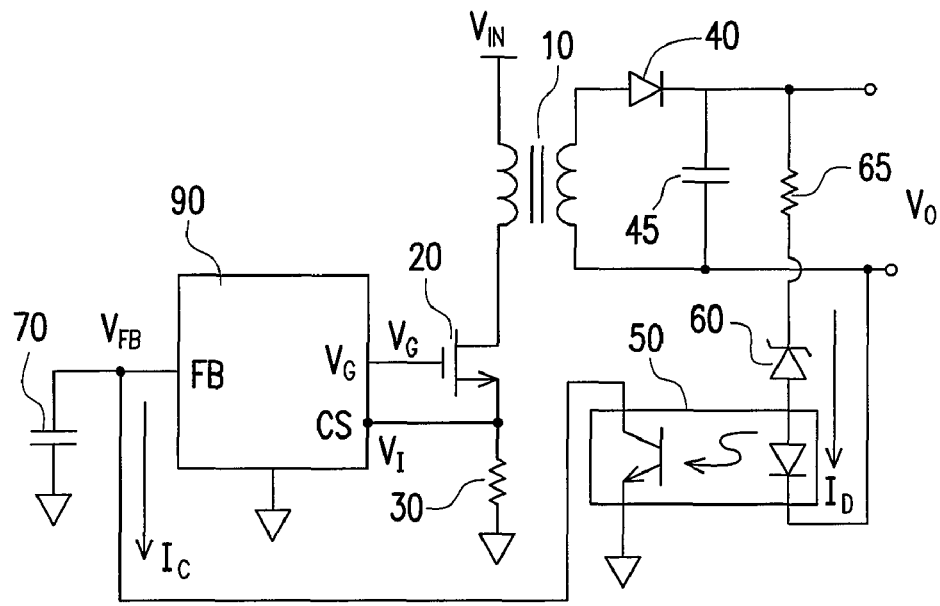
FIG. 1 shows a schematic diagram of a power converter.

FIG. 1 shows a circuit schematic of a power converter. A control circuit 90 generates a switching signal $V_G$ to regulate the output of the power converter in response to a feedback signal $V_{FB}$ at a feedback terminal FB. The switching signal $V_G$ drives a power transistor 20 for switching a transformer 10. The transformer 10 is connected to an input voltage $V_{IN}$ of the power converter for energy store and power transfer. The energy of the transformer 10 is transferred to the output $V_O$ of the power converter through a rectifier 40 and a capacitor 45. A resistor 30 is connected serially with the power transistor 20 to generate a current signal $V_I$ at the current sense terminal CS in response to the switching current of the transformer 10. Through a resistor 65, a zener diode 60 is coupled from the output voltage $V_O$ to an opto-coupler 50. The output of the opto-coupler 50 is coupled to the feedback terminal FB of the controller 90 to form a feedback loop. The pulse width of the switching signal $V_G$ is modulated in response to the feedback signal $V_{FB}$ to achieve the regulation of the power converter.

Figure 2:
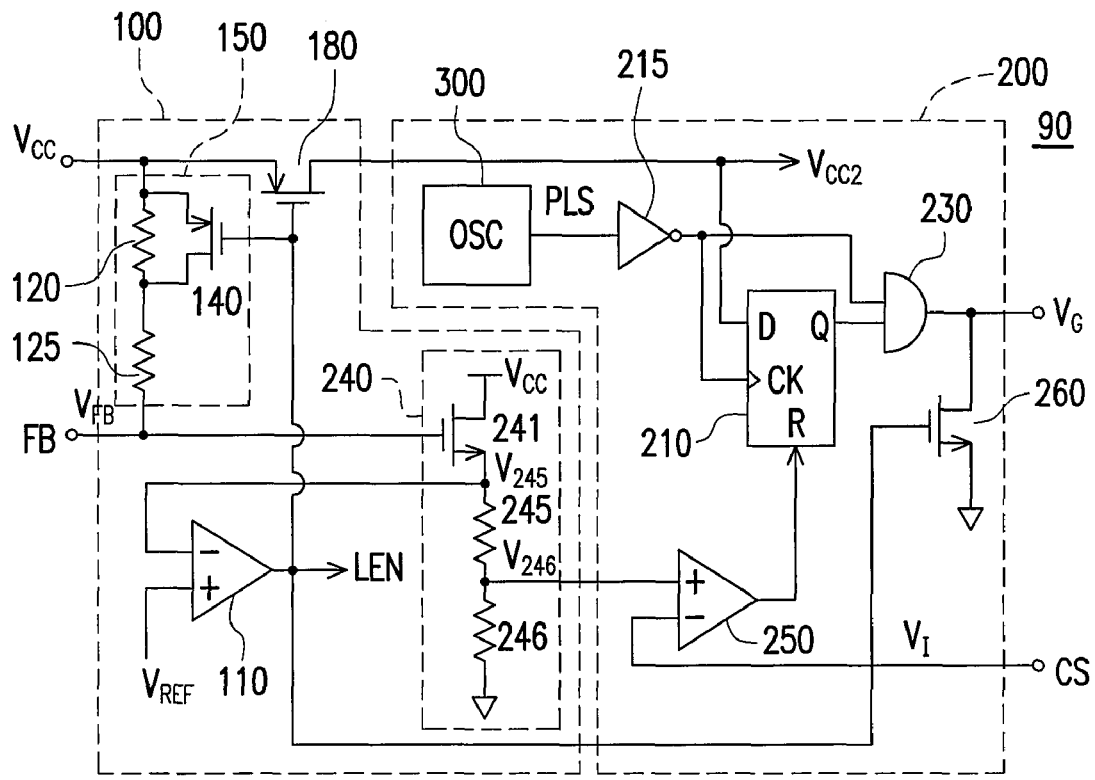
FIG. 2 shows a preferred embodiment of a control circuit of the power converter according to the present invention.

FIG. 2 shows a preferred embodiment of the control circuit 90 according to the present invention. The control circuit 90 includes a standby circuit 100 and a switching control circuit 200. The switching control circuit 200 is used to generate the switching signal VG in response to an oscillation signal PLS. An oscillation circuit 300 is developed to generate the oscillation signal PLS. The switching control circuit 200 includes a flip-flop 210 to generate the switching signal $V_G$ through an AND gate 230. The input of the AND gate 230 is connected to the output of the flip-flop 210. Another input of the AND gate 230 is connected to the oscillation signal PLS through an inverter 215 to limit the maximum duty cycle of the switching signal VG. The flip-flop 210 is enabled in response to the oscillation signal PLS. A comparator 250 is coupled to reset the flip-flop 210. The positive input of the comparator 250 is connected to a feedback input circuit 240 for the feedback loop control. The negative input of the comparator 250 is coupled to a current sense terminal CS of a power converter (shown in FIG. 1) to receive a current signal $V_I$ for the pulse width modulation (PWM).

The standby circuit 100 includes a comparison circuit 110, the feedback input circuit 240, a resistive device 150 and an external capacitor 70 (shown in FIG. 1). The feedback input circuit 240 is coupled to the output of the power converter through the feedback terminal FB and the feedback loop of the power converter. A transistor 241 and resistors 245, 246 form the feedback input circuit 240. The transistor 241 performs the level shift. The feedback signal $V_{FB}$ is connected to the gate of the transistor 241. A shifted feedback signal $V_{245}$ is generated at the source of the transistor 241. Resistor 245 and 246 further provides attenuation to the shifted feedback signal $V_{245}$ to stabilize the feedback loop. The resistor 245 is connected to receive the shifted feedback signal $V_{245}$. An attenuated feedback signal $V_{246}$ is generated at the resistor 246. The attenuated feedback signal $V_{246}$ is connected to the positive input of the comparator 250 for PWM control. The comparison circuit 110 is coupled to the feedback input circuit 240 to generate a mode signal LEN when the shifted feedback signal $V_{245}$ is lower than a threshold signal $V_{REF}$.

An external capacitor 70 is coupled to the feedback terminal FB as shown in FIG. 1. A resistive device 150 is coupled to the feedback terminal FB as well. The resistive device 150 and the capacitor 70 operate as a low-pass filter for the feedback signal VFB. A transistor 140 and resistors 120, 125 develop the resistive device 150. The resistor 120 and the resistor 125 are connected in serial. The transistor 140 is connected to the resistor 120 in parallel. The mode signal LEN controls the on/off states of the transistor 140. Therefore, the resistance of the resistive device 150 is increased in response to the enablement of the mode signal LEN. The mode signal LEN is further coupled to a transistor 180 to turn off the power source VCC2 of the switching control circuit 200 for saving power. Furthermore, the mode signal LEN is coupled to turn off the switching signal VG through a transistor 260.

The resistance of the resistive device 150 will be increased once the switching control circuit 200 is turned off, which causes the feedback signal VFB to be lower. The switching control circuit 200 will be turned on again when the feedback signal VFB is charged up to a voltage VB. The voltage VB can be expressed as, $$V_B = V_A \times \left(1 - \varepsilon^{\frac{-T_{OFF}}{R \times C}}\right) \quad (1)$$

$$V_B = V_{REF} + V_{241} \quad (2)$$

in which the voltage VA is given by, $$V_A = V_{CC} - (I_C \times R) \quad (3)$$

$$I_C = CTR \times I_D \quad (4)$$

$$I_D = \frac{V_O - V_Z - V_D}{R_{65}} \quad (5)$$

where $T_{OFF}$ is the off period of the switching control circuit 200; R is the resistance of the resistive device 150; C is the capacitance of the external capacitor 70; $V_{REF}$ is the voltage of the threshold signal VREF; $V_{241}$ is the threshold voltage of transistor 241; $I_C$ is a feedback current, which is the output current of the opto-coupler 50; $I_D$ is the input current of the opto-coupler 50; CTR is the current transfer rate of the opto-coupler 50; $V_D$ is the forward voltage drop of the opto-coupler 50; $V_Z$ is the voltage of the zener diode 60; $R_{65}$ is the resistance of the resistor 65.

The equation (1) can be rewritten as, $$T_{OFF} = R \times C \times \ln\left(\frac{V_A}{V_A - V_B}\right) \quad (6)$$

The capacitance C of the external capacitor 70 associated with the resistance R of the resistive device 150 determines the $T_{OFF}$ of the switching control circuit 200. The feedback current $I_C$ is further coupled to adjust the $T_{OFF}$ to control the output ripple of the power converter.

Figure 3:
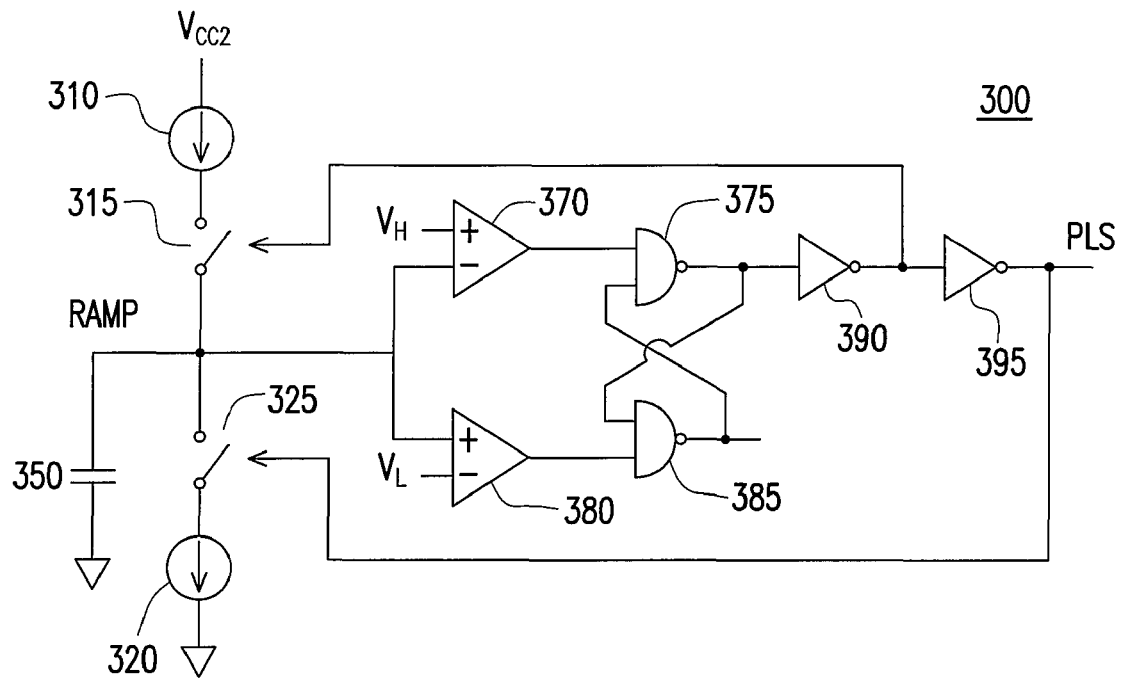
FIG. 3 shows an oscillation circuit.

FIG. 3 shows the oscillation circuit 300. A charge current 310 is connected to a switch 315 in serial for charging a capacitor 350. A discharge current 320 is connected to a switch 325 in serial for discharging the capacitor 350. A ramp signal RAMP is therefore produced on the capacitor 350. Comparators 370, 380 and NAND gates 375, 385 generate the oscillation signal PLS through inverters 390, 395 to control switches 315 and 325. Trip-point voltages $V_H$ and $V_L$ are connected to comparators 370 and 380 respectively. The ramp signal RAMP thus swing in between the trip-point voltage $V_H$ and $V_L$.

Figure 4:
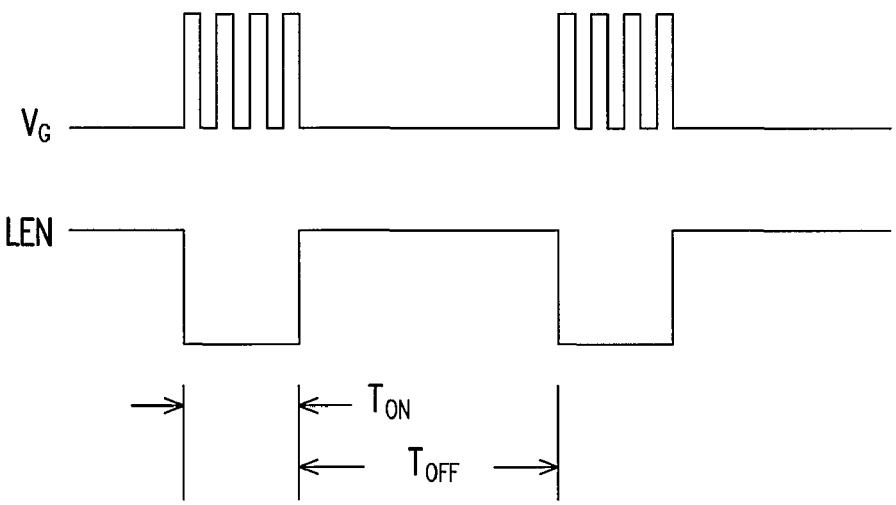
FIG. 4 shows switching signal waveforms.

FIG. 4 shows the waveform of the switching signal VG and the mode signal LEN. The switching signal $V_G$ is enabled during the $T_{ON}$ period. The period of $T_{ON}$ is depended on the load condition and feedback. Once the feedback signal $V_{245}$ is lower than the threshold signal $V_{REF}$. The mode signal LEN will be enabled to turn off the switching signal $V_G$. The $T_{OFF}$ period can be programmed by the external capacitor 70 to prevent the switching period from falling into the audio band.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A standby circuit set in a control circuit of a primary side of a power converter, comprising:
    a comparison circuit, coupled to a feedback loop of the power converter to compare a shifted feedback signal with a threshold signal for generating a mode signal at an output terminal of the comparison circuit, wherein the mode signal is coupled to a switching control circuit of the power converter and configured to turn off the switching control circuit for power saving;
    a resistive device, having a first end connected to the feedback loop and a second end connected to a voltage source, wherein resistance of the resistive device is changed in response to the mode signal; and
    an external capacitor, having a first end connected to the feedback loop and a second end directly grounded,
    wherein the resistance of the resistive device is increased when the mode signal is enabled.

2. The standby circuit of the power converter as claimed in claim 1, wherein the external capacitor associated with the resistive device determine an off period of the switching control circuit of the power converter.

3. The standby circuit of the power converter as claimed in claim 1, in which the mode signal is enabled once the shifted feedback signal is lower than the threshold signal.

4. A controller of a power converter comprising:
    a standby circuit including:
    a feedback input circuit, coupled to a feedback loop of the power converter for receiving a feedback signal from an output of the power converter, performing a level shifting on the feedback signal and providing a shifted feedback signal, wherein the feedback input circuit comprises a first transistor, a first resistor and a second resistor connected in series;
    a comparison circuit, coupled to the first transistor and the first resistor of the feedback input circuit for receiving the shifted feedback signal and comparing the shifted feedback signal with a threshold signal so as to generate a mode signal; and
    a resistive device, coupled to the feedback loop, wherein the resistive device comprises a second transistor connected with a third resistor in parallel, and a fourth resistor connected with the third resistor in series;
    wherein resistance of the resistive device is increased in response to the mode signal; and
    a switching control circuit, generating a switching signal to regulate the output of the power converter in response to the mode signal.

5. The controller of the power converter as claimed in claim 4, wherein the standby circuit further comprises an external capacitor coupled to the resistive device.

6. The controller of the power converter as claimed in claim 5, in which the external capacitor associated with the resistive device determine an off period of the switching control circuit of the power converter.

7. The controller of the power converter as claimed in claim 4, in which the mode signal is further coupled to turn off the switching control circuit of the power converter for power saving.

8. A control circuit of a power converter, comprising:
a standby circuit, including:
  a comparison circuit, coupled to a feedback loop of the power converter to compare a shifted feedback signal with a threshold signal for generating a mode signal;
  a resistive device, having a first end connected to the feedback loop and a second end connected to a voltage source, wherein the resistive device comprises a first transistor connected with a first resistor in parallel and a second resistor connected with the first resistor in series, and resistance of the resistive device is changed in response to the mode signal; and
  an external capacitor, having a first end connected to the feedback loop and a second end directly grounded; and
  a switching control circuit, coupled to an output terminal of the comparison circuit through a second transistor, configured for generating a switching signal of the power converter, wherein the second transistor is controlled by the mode signal to turn off the switching control circuit of the power converter for power saving.

9. The control circuit of the power converter as claimed in claim 8, wherein the standby circuit further comprises the external capacitor coupled to an feedback input circuit.

10. The control circuit of the power converter as claimed in claim 9, in which the external capacitor associated with the impedance of an feedback input circuit determine an off period of the switching control circuit of the power converter.

11. The control circuit of the power converter as claimed in claim 8, in which the impedance of an feedback input circuit is increased in response to the enable of the mode signal.

* * * * *